United States Patent [19]

Urano et al.

[11] 4,034,390
[45] July 5, 1977

[54] MAGNET WARNING DEVICE FOR FOCAL PLANE ELECTRIC SHUTTER CAMERA

[75] Inventors: Fumio Urano, Omiya; Tetsuji Shono, Ranzan, both of Japan

[73] Assignee: Asahi Kogaku Kogyo Kabushiki Kaisha, Tokyo, Japan

[22] Filed: Apr. 27, 1976

[21] Appl. No.: 680,568

[30] Foreign Application Priority Data

May 2, 1975  Japan .............................. 50-53985

[52] U.S. Cl. .............................. 354/244; 354/268
[51] Int. Cl.² .......................................... G03B 9/34
[58] Field of Search .......... 354/242, 243, 244, 246, 354/268

[56] References Cited

UNITED STATES PATENTS

| | | | |
|---|---|---|---|
| 3,774,514 | 11/1973 | Okamoto et al. | 354/243 X |
| 3,930,263 | 12/1975 | Urano | 354/268 |

*Primary Examiner*—L. T. Hix
*Assistant Examiner*—Michael L. Gellner
*Attorney, Agent, or Firm*—Sughrue, Rothwell, Mion, Zinn & Macpeak

[57] ABSTRACT

A mechanical arrangement is disclosed for blocking the electric shutter operation of a camera when the rear shutter holding electromagnet is not energized sufficiently to hold the rear shutter. A pair of gears for the front and rear shutters, respectively, are mechanically linked to the shutters to prevent their running when the gears are held stationary. A release controlled lever holds the front shutter gear stationary, and the stationary position of the front shutter gear holds the rear shutter gear stationary. When the release button is depressed the front gear is released from the lever and rotates as the front shutter runs to an unblocking position. Rotation of the front gear frees the rear gear, but the rear shutter is held by the electromagnet until the exposure time is completed. Thereafter the electromagnet is deenergized causing the rear shutter to run to its blocking position and the rear shutter gear to rotate. If the electromagnet is not sufficiently strong, e.g. because of a reduction in battery power, to hold the rear shutter, both shutters will start to run and both gears will start to rotate simultaneously. A lever held in a first position by the starting position of the rear shutter gear, moves to a second, blocking position, when the rear shutter gear starts to rotate. When in the blocking position, the lever stops further rotation of the front shutter gear which, in turn, stops further rotation of the rear shutter gear. The operator, as a result, hearing no running sound of the shutters knows there is a failure in the electromagnet circuitry.

6 Claims, 1 Drawing Figure

U.S. Patent     July 5, 1977     4,034,390
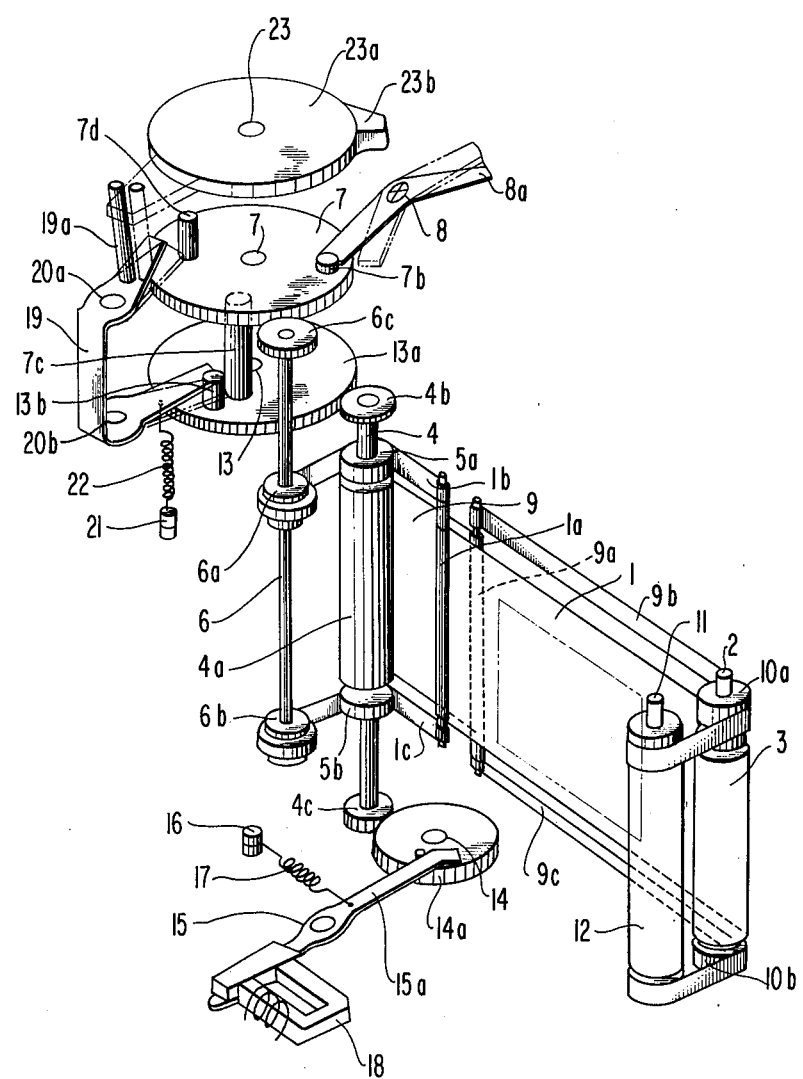

MAGNET WARNING DEVICE FOR FOCAL PLANE ELECTRIC SHUTTER CAMERA

BACKGROUND OF THE INVENTION

The present invention relates to a magnet warning device for a camera equipped with a focal plane electric shutter.

In cameras having a focal plane electric shutter, exposure is initiated by releasing the front shutter or front blind from its mechanically retained blocking porition to an unblocking position. The rear shutter or rear blind is retained in its unblocking position by a rear blind retaining electromagnet. A time constant circuit deenrgizes said electromagnet several predetermined seconds or fractions of a second after the starting operation of the front blind to release the rear blind from its retained condition and permit it to run to its blocking condition, thereby to ensure the desired exposure. However, if a malfunction is experienced, e.g., the magnet is not energized or the voltage necessary for retaining the rear blind is insufficient, the rear blind goes out of control and starts its running operation simultaneously with the start of the front blind. As a result there will be no exposure and proper photography becomes impossible. It therefore is important to provide the operator with some warning indication.

Several warning methods and devices are known in the art. The construction employed in such warning methods are, however, accompanied by a variety of drawbacks, such as, complexity, too many parts, too many steps of their assembly, inferiority in their production or instability in their function.

SUMMARY OF THE PRESENT INVENTION

Therefore, an object of the present invention is to eliminate the above drawbacks and to provide a magnet warning mechanism which holds both front and rear blinds in their starting position when the electromagnet fails. The absence of the noise which accompanies the running of the blinds serves as a warning to the operator.

The object is accomplished by providing a front blind retaining lever which is held in a first position when the rear blind is retained in the stationary unblocking condition. The lever moves to a second position when the rear blind begins to run. If the magnet fails so that the rear blind begins running simultaneously with the front blind, the front blind retaining lever immediately moves to its second position and there blocks further movement of the front blind. Thus, the magnet warning device according to the present invention can partly accomplish the above object by the use of a simplified mechanical construction and partly give to the operator a signal indicating that the shutter releasing operation is not carried out.

BRIEF DESCRIPTION OF THE DRAWING

The only FIGURE is a perspective view showing construction of an essential portion of a magnet warning device exemplifying the present invention and for use in a camera equipped with a focal plane electric shutter.

DETAILED DESCRIPTION OF THE DRAWING

One embodiment of a magnet warning device for a camera equipped with a focal plane electric shutter will now be described in detail with reference to the accompanying drawing. Indicated at reference numeral 1 is a shutter front blind wound on and having its one end secured to a front blind drum 3, which is rotatably supported around a front blind drum shaft 2 secured to a camera body (not-shown). Front blind ribbons 1b and 1c are wound upon and have their respective first ends secured to front blind winding rollers 6a and 6b and their respective second ends secured to an edge 1a of the front blind 1. Rollers 6a and 6b are secured to front blind pinion shaft 6, which is rotatably supported in the camera body. The front blind ribbons turn at a right angle on rollers 5a and 5b which are rotatably supported around a rear blind pinion shaft 4, also rotatably supported in the camera body.

A torsion spring (not shown) is disposed inside front blind 3 and is wound around the front blind drum shaft 2 in a manner such that one end is mounted on the front blind drum shaft 2 and the other end is mounted on the front blind drum shaft 2 and the other end is mounted on the front blind drum 3. This arrangement provides the front blind drum 3 with a clockwise biasing force, thereby urging the shutter front blind 1 to run from left to right. However, the blind 1 is maintained in the illustrated stationary blocking position by means of a front blind pinion 6c, secured to the front blind pinion shaft 6, a front blind gear 7a in meshing enagement therewith, and a front blind retaining lever 8a. Gear 7a is rotatably supported on a front blind gear shaft 7 secured to the camera body and has a pin 7b embedded therein and in abutment engagement with the lever 8a. The lever is rotatably supported around a front blind retaining shaft 8 secured to the camera body. When the lever 8a is in the position shown by the solid lines, the gear 7a cannot rotate. Therefore the pinion 6c, shaft 6, and rollers 6a and 6b cannot rotate, and front blind 1 is restrained from running to an unblocking position. Movement of lever 8a to the position shown by the dotted lines releases the front blind 1. Such movement is responsive to depression of the shutter release button, not shown.

A rear shutter or rear blind 9 is wound upon and has its one end secured to a rear blind shaft 4a which is secured to the rear blind pinion shaft 4. To both sides of an edge 9a secured to the rear blind 9, there are secured rear blind ribbons 9b and 9c, which are wound upon and have their ends secured to a rear blind drum 12 rotatably supported around a rear blind drum shaft 11 secured to the camera body. Rear blind ribbons 9b and 9c are turned at right angles by rollers 10a and 10b, respectively, which are rotatably supported on the front blind drum shaft 2. Inside of the rear blind drum 12 there is disposed a torsion spring (not-shown), which is wound around the rear blind drum shaft 11 in a manner to have one end mounted on the rear blind drum shaft 11 and the other end mounted on the rear drum 12. This provides a clockwise biasing force on the rear blind drum 12 thereby urging the rear blind 9 to run from left to the right. However, the rear blind is held in the illustrated unblocking position by two separate mechanisms. The first rear blind holding mechanism comprises electromagnet 18, armature lever 15a pivoting about shaft 15, pin 16, spring 17, cooperative gear 14a rotating about shaft 14 and having a stop pin 14b thereon, and pinion 4c secured to shaft 4. The electromagnet is controlled by the camera exposure time constant circuit, as is well known in the art. While the electromagnet is energized, the combined force of the magnet and biasing spring 17 holds the armature lever 15a in the position as shown to block rotation of cooperative gear 14a. This, in turn, prevents rotation of pinion 4c, shaft 4 and drum 4a thereby holding rear blind 9 in the stationary unblocking position. When the mechanism is operating normally, the electromagnet 18 becomes deenergized at a time T following release of the front blind 1. This removes the magnetic holding force and permits the running of the rear blind 9 to the blocking position thereby terminating the exposure.

The second rear blind holding mechanism comprises, pinion 4b secured to shaft 4, rear blind gear 13a supported on a shaft 13, pin 13b secured to ear 13a and pin 7c secured to front blind gear 7a. Pin 7c abuts pin 13b so that pin 13b cannot rotate past the position of pin 7c. Thus, when the front blind gear 7a is restrained by lever 8a, the rear blind gear 13a is restrained by the action of pins 7c and 13b. At the start of operation the lever 8a is moved to an unblocking position permitting gear 7a to rotate counter clockwise in response to the biasing force in roller 3 acting through front blind 1, rollers 6a and 6b, and pinion 6c. As a consequence, pin 7c is moved away from pin 13b. However, gear 13a will not rotate immediately because of the holding action of the electromagnet 18 and associated mechanism.

If the electromagnet fails, e.g. the power source has drained or has not been inserted, then as soon as gear 7a rotates with the running of front blind 1, the rear blind is free to run to its blocking position. The simultaneous running of the front and rear blinds prevents the desired exposure operation. However, a front blind retaining lever is provided to stop the running of the blinds when the latter condition prevails, i.e. when the electromagnet fails. The front blind retaining lever 19 is rotatably supported around front blind retaining lever shafts 20a and 20b, which are secured to the camera body, and is normally biased by the action of a pin 21 and a spring 22 to rotate clockwise. In the condition in which the winding operation of the shutter system is completed, as shown in the drawing, the lower arm of the front blind retaining lever 19 is in abutting engagement with the pin 13b. As a result the upper arm of lever 19 is also in the position shown by the solid lines. When the rear blind starts to run and concomitantly the gear 13a rotates counter clockwise, the arms of lever 19 become free to rotate clockwise under the influence of spring 22. During normal operation the clockwise rotation of lever 19 has no effect on the operation. However, if the electromagnet fails, and consequently both blinds, 1 and 9, and both gears, 7a and 13a, begin to move simultaneously, the clockwise movement of lever 19 brings the upper arm of the lever into abuttment with a stopping pin 7d on gear 7a. This stops the rotation of gear 7a, which stops the running of the front blind 1. Also, pin 7c stops the rotation of gear 13a, which stops the running of the rear blind 9. Since the blinds do not run in response to depression of the shutter release button (except for the minute amount necessary to permit rotation of lever 19) the operator will not hear the usual running noise and will therefore be warned of the failure of the electromagnet.

In order to relieve the camera from the retained condition just described, the front and rear blinds 1 and 9 may be allowed to run, simultaneously, by manually turning the front blind retaining lever 19 in the counter clockwise direction by means of a manual control, not shown.

If the camera is of the type in which the front blind retaining lever 8a is moved directly by the release button, the blinds can be released from their retained condition by rewinding the film. If, on the other hand, the camera is the type in which the shutter is controlled mechanically when the shutter speed dial is turned to select the B (bulb) contact or the X contact operations the shutter dial may be arranged to cause release of the blinds from the retained condition. For example, the shutter speed dial 23a, which is made movable around a shaft 23 secured to the camera body, is manually actuated for the B and X contact operations so as to turn a projection 23b of the shutter dial 23a to the position as shown by the double dotted lines. Thus the selection of the B and X contact operations turns a pin 19a, which is embedded in the front blind retaining lever 19, from the position as shown by the double dotted lines to the position as shown by the solid lines. Thus, the front and rear blinds 1 and 9 can run, simultaneously, to restore the shutters to their initial precocked condition. Thereafter, the camera can be operated at such mechanically controlled shutter speeds as are used for the B and X contact operations despite malfunction of the magnet.

As described above, a magnet warning device is provided, in which a front blind retaining lever, movable over a range which can prevent a front roller blind from its initial running travel, dependent upon the initial running travel of a rear roller blind, retains the front blind immediately after its start when the magnet is not capable of its holding operation. Thus, the magnet warning device has a simplified construction with such resultant effects that the steps for assembly can be remarkably simplified, that is productivity is excellent, that its function is highly stable, and that its operation is reliable.

What is claimed is:

1. In a camera of the type having a focal plane electric shutter comprising a front blind which runs from a blocking to an unblocking position to start exposure, a rear blind which runs from an unblocking position to a blocking position to end the exposure, and an electromagnet for retaining and releasing said rear blind to hold said rear blind in said blocking position and to permit said rear blind to run to its unblocking position, respectively, the improvement comprising mechanical means, responsive to the start of movement of said rear blind from an unblocking to a blocking position simultaneously with the start of movement of said front blind from a blocking to an unblocking position, for stopping the movement of said rear and front blinds before they move to the blocking and unblocking positions respectively.

2. A camera as claimed in claim 1 wherein said mechanical means comprises, a front blind gear mechanically linked to said front blind so as to prevent the running of said front blind when said gear is blocked from freely rotating, a rear blind gear mechanically linked to said rear blind so as to prevent the running of said rear blind when said gear is blocked from rotating, said rear blind also being restrained from running by operation of said electromagnet, means on said front blind gear from restraining movement of said rear blind gear, a lever biased to move to a position to restrain movement of said front blind gear and restrained from movement to said position by said rear blind gear when said latter gear is in a position corresponding to the unblocking position of said rear blind, whereby the failure of said electromagnet to restrain running of said rear blinding causes said rear blind gear to rotate simultaneous with the start of rotation of said front blind gear, which then causes said lever to move to said biased position to stop the rotation of said front blind gear and concomitantly stop the rotation of said rear blind gear.

3. A camera as claimed in claim 2 wherein a first pin on said rear blind gear restrains said lever in a position against said biased position until said rear blind gear begins to rotate concurrently with the running of said rear blind, and wherein a second pin on said front blind gear abuts said lever when said lever is in said biased position to prevent rotation of said front blind gear.

4. A camera as claimed in claim 3 wherein said means on said front blind gear for restraining movement of said rear blind gear comprises a third pin on said front blind gear extending to said rear blind gear and abutting said first pin.

5. A camera as claimed in claim 3 further comprising a release controlled lever having a first position for stopping rotation of said front blind gear and a second position which does not stop rotation of said blind gear.

6. A camera as claimed in claim 1, said camera further being of the type having a shutter speed select dial and being capable of mechanical shutter speed operation in response to selection by said dial, the improvement further comprising means mechanically linked to said dial for moving said mechanical stopping means to a position which no longer blocks the running of said blinds when said dial is positioned to select said mechanical shutter speed operation.

* * * * *